Figure 1:
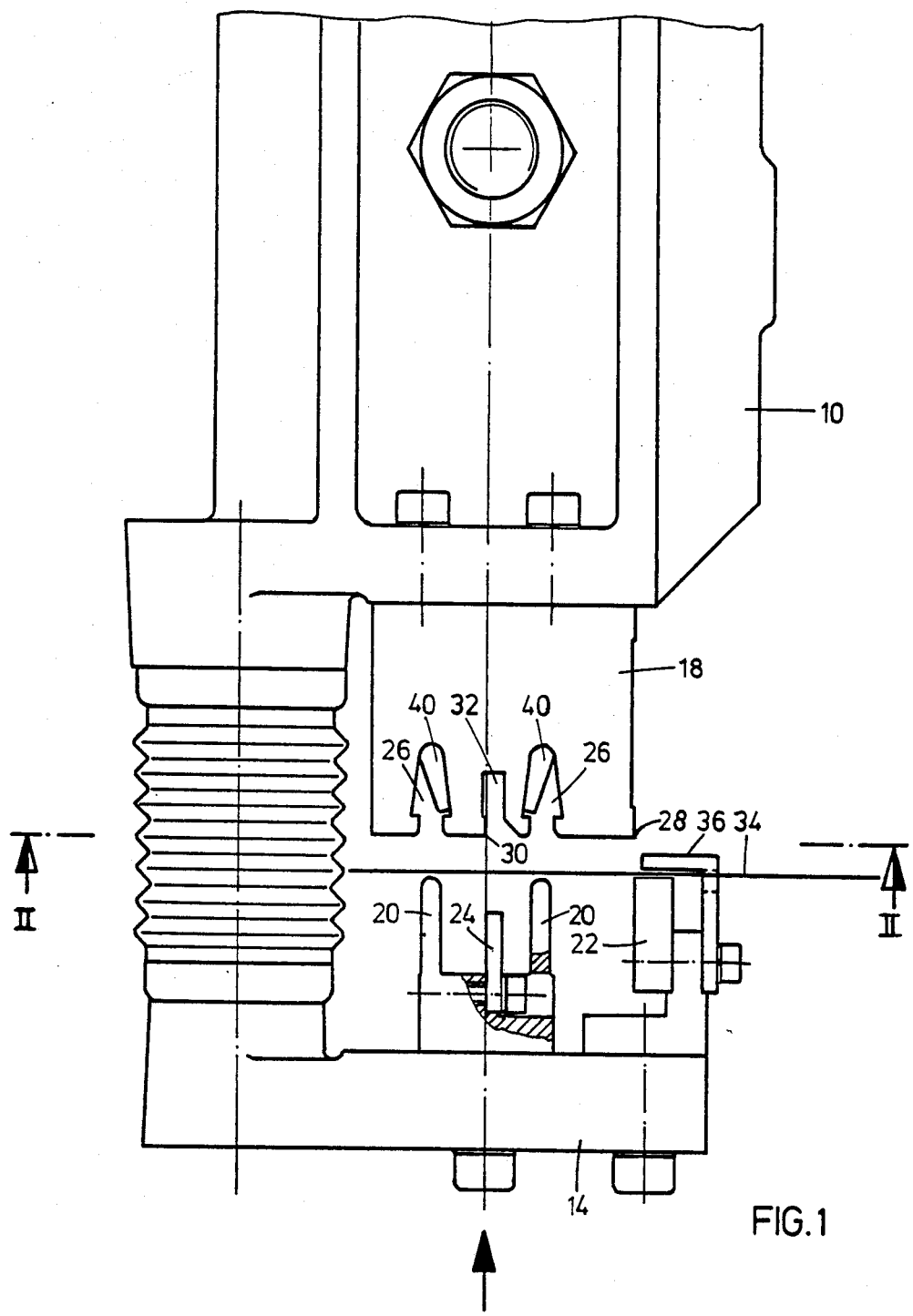

United States Patent [19]

Schultes

[11] Patent Number: 4,748,732

[45] Date of Patent: * Jun. 7, 1988

[54] STATOR SLOT LINER APPARATUS INCLUDING A SPEED CHANGE MECHANISM

[75] Inventor: Otto Schultes, Staudt, Fed. Rep. of Germany

[73] Assignee: Statomat-Globe Maschienenfabrik GmbH, Niederdorfelden, Fed. Rep. of Germany

[*] Notice: The portion of the term of this patent subsequent to Sep. 15, 2004 has been disclaimed.

[21] Appl. No.: 48,216

[22] Filed: May 11, 1987

Related U.S. Application Data

[62] Division of Ser. No. 766,926, Aug. 19, 1985, Pat. No. 4,692,972.

[30] Foreign Application Priority Data

Aug. 31, 1984 [DE] Fed. Rep. of Germany ....... 3432038

[51] Int. Cl.⁴ ............................................. B21D 39/03
[52] U.S. Cl. ...................................... 29/33 L; 29/56.5; 29/73.4
[58] Field of Search ..................... 29/33 L, 56.5, 73.4, 29/596

[56] References Cited

U.S. PATENT DOCUMENTS

| | | |
|---|---|---|
| 1,529,741 | 3/1925 | H'Doubler . |
| 2,340,291 | 2/1944 | Wirtz . |
| 2,638,661 | 5/1953 | Klinksiek . |
| 2,835,372 | 5/1958 | Biddison . |
| 2,958,122 | 11/1960 | Turk . |
| 3,514,836 | 7/1967 | Mason . |
| 3,616,512 | 12/1969 | Appenzeller et al. . |
| 3,634,932 | 1/1972 | Mason . |
| 3,672,039 | 6/1972 | Arnold . |
| 3,703,854 | 11/1972 | Schlaudroff . |
| 3,745,394 | 7/1973 | Mason . |
| 4,276,689 | 7/1981 | Urick et al. . |

FOREIGN PATENT DOCUMENTS 1613458 6/1970 Fed. Rep. of Germany .
837782 6/1960 United Kingdom .

Primary Examiner—Howard N. Goldberg
Assistant Examiner—Joseph M. Gorski
Attorney, Agent, or Firm—Jeffers, Hoffman & Niewyk

[57] ABSTRACT

A device for the lining of slots of stator or rotor lamination packs for electrical machines with slot liners. The device includes a matrix having two slots therein, a die plate including at least two forming dies, a cutting plate, structure for causing the slot liners to be aligned flush with slots in the lamination pack, and an insertion punch for simultaneously pushing slot liners out of the forming slots and through the forming structure.

2 Claims, 4 Drawing Sheets

STATOR SLOT LINER APPARATUS INCLUDING A SPEED CHANGE MECHANISM

This is a division of application Ser. No. 766,926, filed Aug. 19, 1985 now U.S. Pat. No. 4,692,972.

This invention relates to a process for the lining of slots of stator or rotor lamination packs for electrical machines with slot liners together with a device for the execution of this process. It is based on the prior art as per U.S. Pat. No. 2,340,291. The slot lining machine described therein is still built today unmodified in principle. The work process is as follows in this:

A strip of insulation material whose width is greater by a certain dimension than the height e.g. of a certain stator lamination pack is usually folded over at the edges and fed into a combined cutting and forming tool in this state. The folded over edges later provide the so-called lips of the slot liners which lie outside of the stator slots. The overall form length of a slot liner is cut off each time in a single stroke from the strip of insulation material with edges folded over by the combined cutting and forming tool and formed into a U-shape in accordance with the cross-section of the slot to be lined by means of a matrix and a form die interacting with it. Subsequently the slot liner is pushed out of the matrix axially by an insertion punch into the appropriate stator slot which has been aligned to be flush. Then the stator lamination pack is rotated further by one slot spacing and the next slot liner produced and inserted in the same manner. The step by step rotational movement of the stator lamination pack and the backward and forward movements of the cutter and forming die on the one side together with the insertion punch on the other side are synchronised by a common cam and gear wheel transmission. The cycle time amounts to only ¼ second and can hardly be reduced for such a machine. Thus the only alternative remaining if even shorter manufacturing times are to be achieved is to work parallel on two slot lining machines.

The invention has the object of achieving a quite considerable acceleration of the manufacturing speed with a minimum of additional effort and this objective is solved in terms of processing in that the overall form length for two slot liners is separated in each work cycle from the magazine strip and both slot liners are shaped simultaneously and pushed into the slots.

Particularly simple movement conditions result in the process according to the invention when the two insulation strip sections are pressed into the form parallel to one another and to the plane of symmetry of both slots and then, considering the fact that the stator slots are not set parallel but radially each time, when the slot liners are pushed out of the form into the slots, during the transitional travel the outer sides of the slot liners are close enough to the inner sides so that the two slot liners are flush with the appropriate slots.

Relatively sophisticated guidance and control elements would have to be employed if the two simultaneously, parallel applied insulation strip sections were to be each first cut to the predetermined length and then formed. In the preferable version of the process according to the design only a single cut is carried out initially with which the entire length of the two insulation strip sections is cut off from the magazine strip. Then the forming process for the two slot liners begins and not until the forming process is in progress does separation between the two insulation strip sections take place.

For design reasons it is advantageous if the two simultaneously lined slots have a circumferential slot spacing of three times from one another and the stator or rotor lamination pack is rotated by twice the spacing relative to the form after each work cycle. Thus under normal, practical conditions a sufficient but not excessive space results between the two parallel functioning form tool components. All stators with a number of slots of the same cross-section and which is divisable by two can be insulated in this manner in each case with constant rotational change switch steps.

There are also stators with several slots of varying cross-sections, whereby certain slots are distributed unevenly over the circumference of the stator drill-hole. Until now the cam and gear wheel transmissions used for reasons of functional safety only produced constant rotational switching movements of the stator lamination packs. If the angular spacing between two slots of the same cross-section amounted to a multiple of the slot spacing then the machine carried out an appropriate surplus number of rotational switching movements and only stopped the insulation strip feed temporarily in doing so. In comparison the process in accordance with the invention provides in the above mentioned cases that a stator or rotor lamination pack is turned step by step at varying angular increments, relative to the form, when lining the slots, whereby it is preferable that the rotational drive of the stator or rotor lamination pack is forced to switch over mechanically.

A device for the execution of the new process has a forming tool in the conventional manner, comprising a matrix and a die plate with a form die together with an insertion punch moveable crosswise to the latter for pushing the slot liners out of the matrix into the slots, wherein, two form dies are located on the die plate and between them a cutting plate, two form slots are shaped in the matrix and the slot liners formed in them are insertable into two slots of the stator or rotor lamination pack simultaneously via two insertion punches.

Should it prove to be the case that the dual groups of slots to be lined for a particular stator lamination pack are not evenly distributed over the circumference then a further advantageous version of the invention for an otherwise already known slot lining machine can be provided with a cam drum executing one revolution for each cutting and forming process with guidance cams for forming and insertion punches together with a change gear mechanism driven via a Geneva cross drive, for the purpose of setting two different rotational speed ratios between the cam drum and a work holder supporting the stator or rotor lamination pack, so that the gear transmission is switchable by a further guidance cam on the cam drum. Thus a simple forced guidance has been found which reliably prevents malfunctioning and false movements.

In the preferable, practical version the change mechanism's gear wheels which carry out the change movement are seated on an axially slideable component of the Geneva cross shaft, fixed torsionally, upon which several driving tongues which are distributed over the circumference, stretch out radially and interact alternately with the switch cam, each of which being fixable in one of two different axial positions, and these driving tongues come into contact with one of two guidance surfaces of the switch cam located opposite, running in axially opposed directions.

Figure 2:
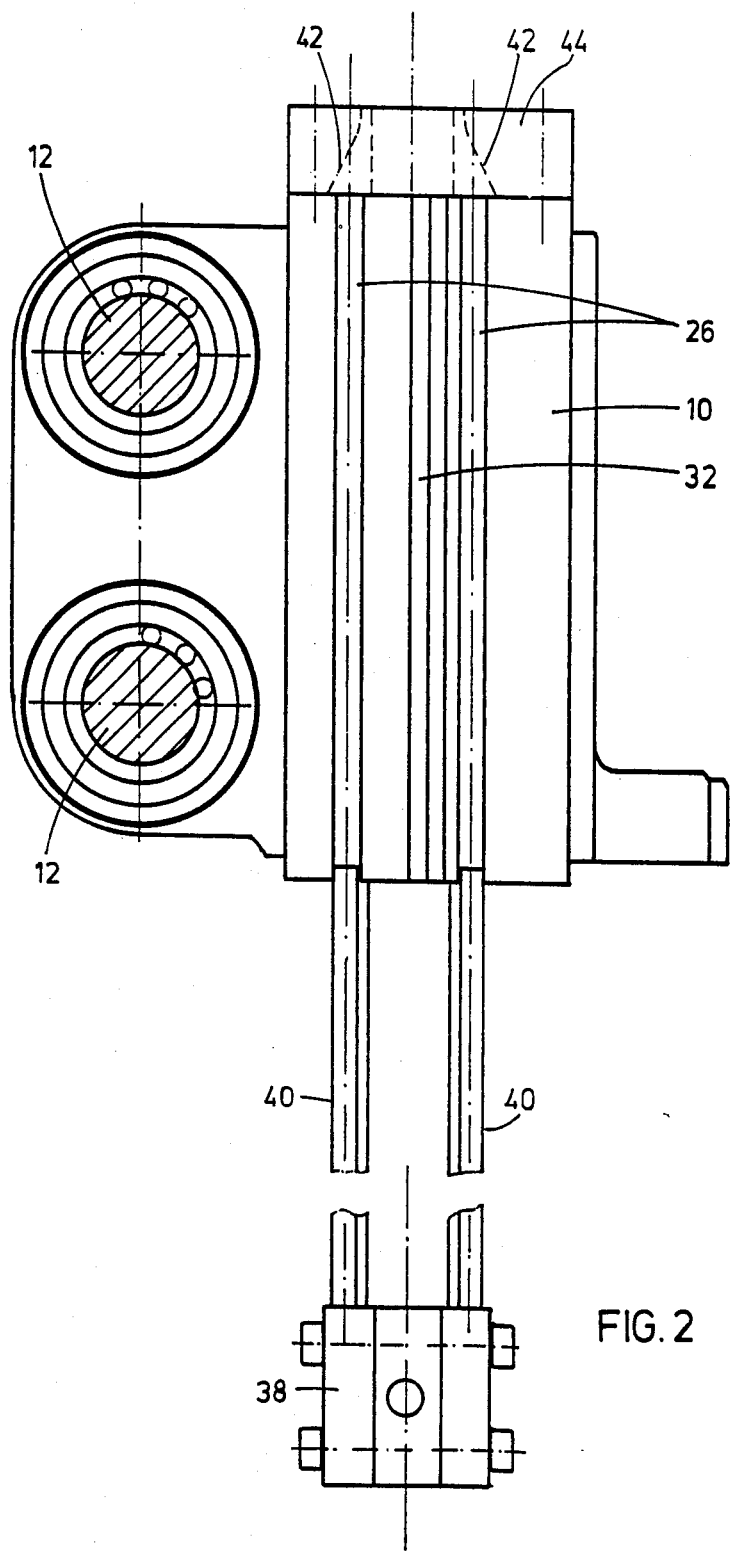
Figure 3:
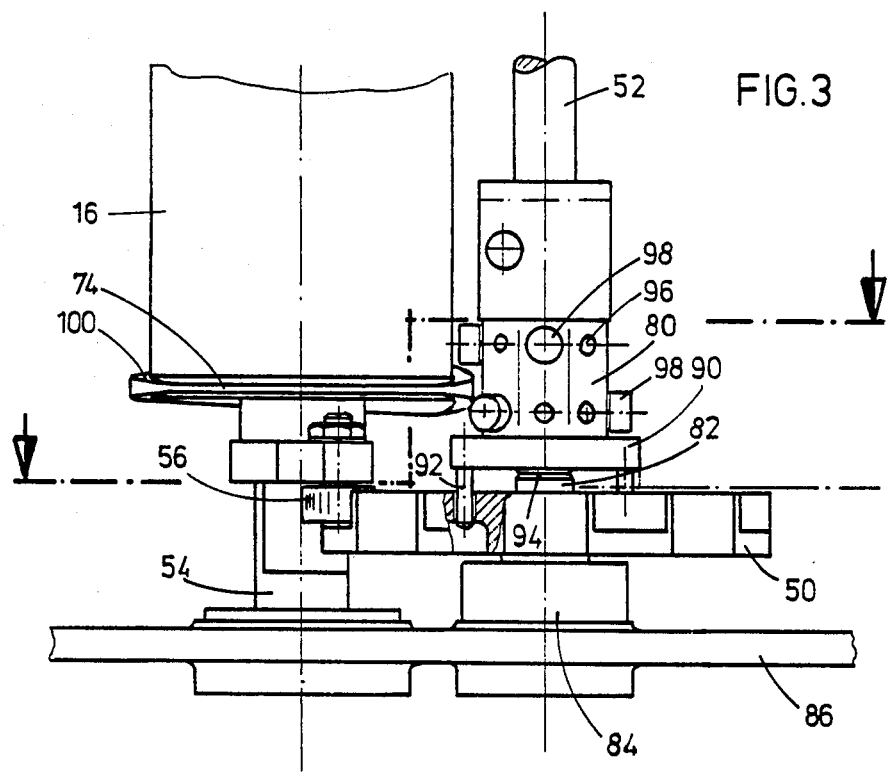
Figure 4:
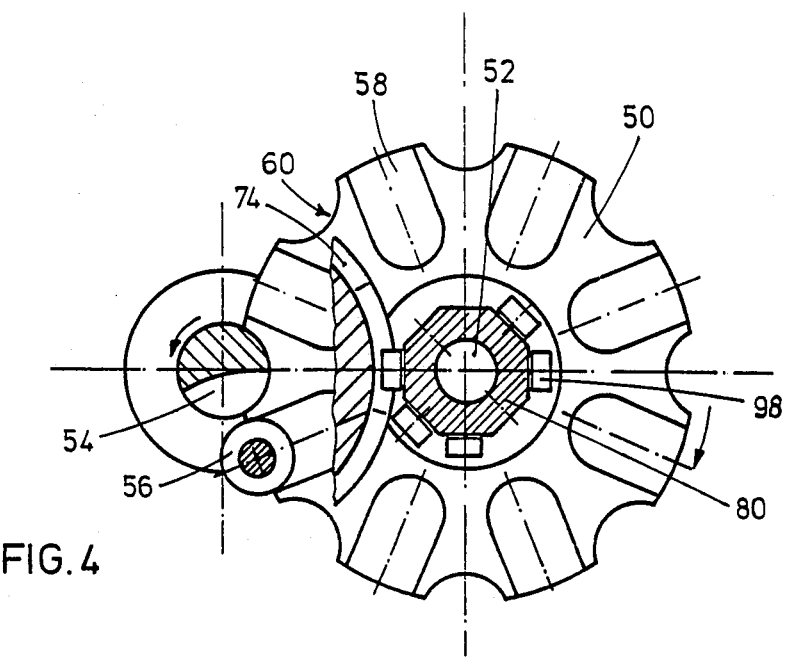

The invention is explained in more detail with the help of the drawings as follows. The following is shown:

FIG. 1 a plan view of a combined cutting and forming tool for slot liners for a slot lining machine;

FIG. 2 a vertical cross-section as per section line II—II in FIG. 1;

FIGS. 3 and 4 a side elevation and plan view partially of the Geneva cross drive section for the rotational switching movement of the stator lamination pack and an additional switching device for the axial sliding of a part of the Geneva cross shaft.

Figure 5:
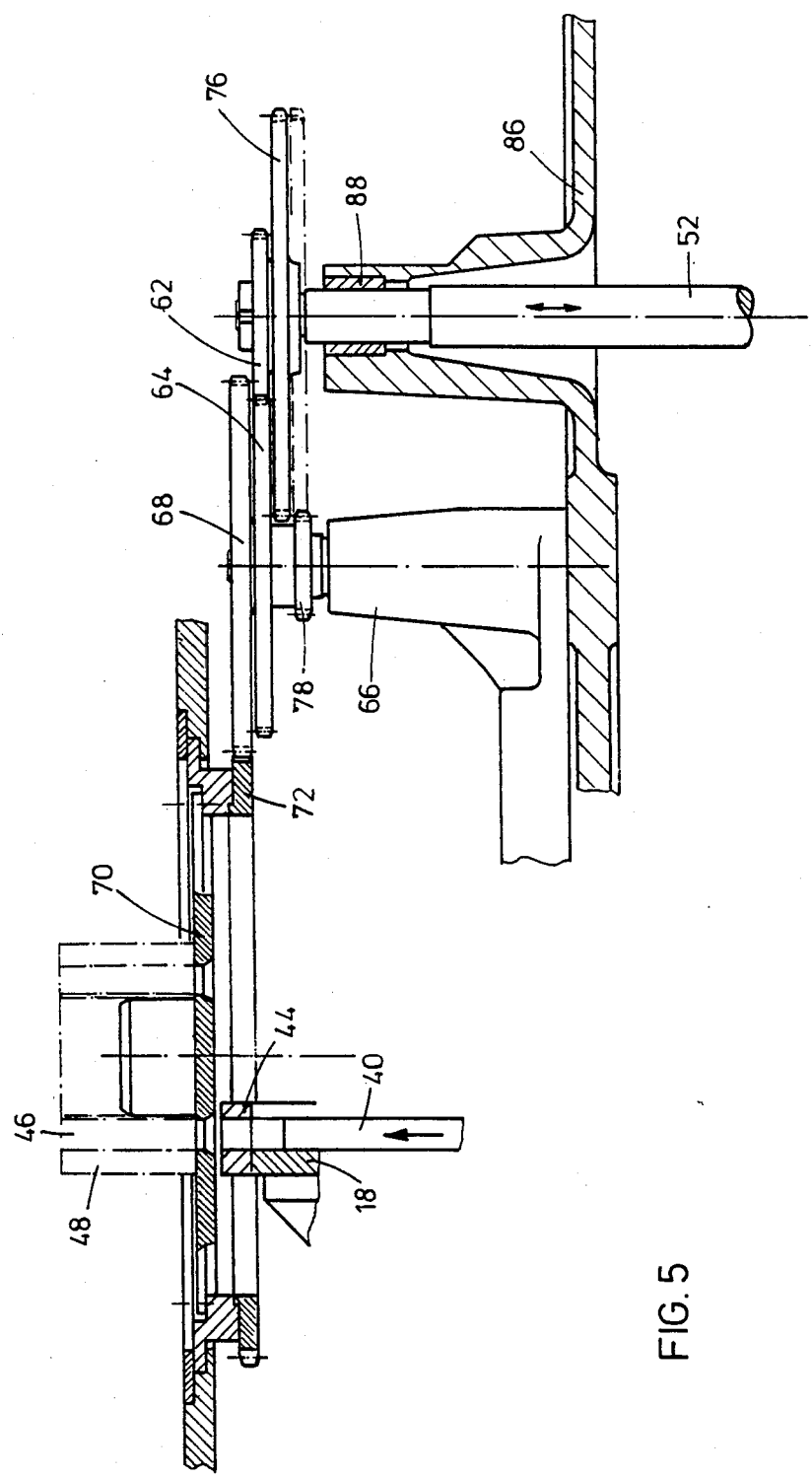

FIG. 5 a cross-section through the work-piece holder which supports the stator lamination pack during the insulation of the slots and switches them further together with the appropriate transmission.

Since the invention illustrates an improvement of the device according to U.S. Pat. No. 2,340,291, the following exemplory description can be limited to those details by which the invention differs from the prior art quoted. Initially this is the design of the cutting and forming tool together with the insertion punch in accordance with FIGS. 1, 2 and 5. The cutting and forming tool is fixed in a known manner to a pillar guidance frame whose fixed base is designated by 10 and whose moveable upper part by 14, this being supported by slideable guidance pillars 12. The backward and forward drive of the upper part 14 takes place in a known manner via non-illustrated levers and a guidance cam on a cam drum 16 indicated in FIG. 3. This drive mechanism described in U.S. Pat. No. 2,340,291 does not form part of the invention.

For the forming of the slot linings a one or multi-part matrix 18 is fixed to the pillar guidance frame base 10, whilst the upper part 14 supports two form dies 20 in one or multi-part version as well as a lateral and a central cutting plate 22 viz. 24. The two form dies 20 interact with opposed form slots 26 in the matrix 18, the lateral cutting plate 22 with a lateral shearing edge 28 and the central cutting plate 24 with a central shearing edge 30 onto a central groove 32 in the matrix. As shown groove 32 is wider than the cutting plate 24 and apart from this is bevelled or rounded on the longitudinal edge opposite the cutting edge 30. As is evident from the drawing also the free ends of the form die 20 protrude compared with the central cutting plate 24, whilst the lateral cutting plate 22 protrudes compared with the form dies 20. In this manner first the lateral cutting plate 22, then the form die 20 and then, during the forming process, the central cutting plate 24 are effective when the front edge of the matrix 18 is straight and upper part 14 of the pillar guidance frame is fed in the direction of base part 10.

The strip shaped insulation material to be cut and formed is designated by 34 in FIG. 1. It is pulled off of a magazine roll in a known manner and folded over continuously at the lateral edges before it is fed with edges folded over to the cutting and forming tools shown in FIG. 1. A bracket 36, with guidance slot shaded in the illustration, fixed next to the lateral cutting plate 22 ensures that the strip shaped material 34 is held on the cutting plate 22 in each movement phase of the moveable tool component and guided along this.

In the example according to FIG. 1 the tool components described above are fixed to the pillar guidance frame by means of screws whereby separate brackets support the form die 20 and the lateral cutting plate 22. The central cutting plate 24 is screwed firmly onto form dies 20 bracket. It is self-evident that the latter quoted parts can each be fixed as an alternative individually to the moveable upper part 14 of the pillar guidance frame or also together to a single bracket.

It can be seen from FIG. 1 in conjunction with FIG. 2 and 5 that two insertion punches 40 fixed to a common bracket can be run into the form slots 26 from below in order to push the slot liners formed in these simultaneously through oblique slots 42 into a form unit 44 and upwards into the two slots 46 of a stator lamination pack 48. The backwards and forwards drive of bracket 38 together with the insertion punches 40 also takes place as known from U.S. Pat. No. 2,340,291, via a lever transmission by a non-illustrated guidance cam on cam drum 16.

The part of the device described up to this point functions as follows:

Initially the insulation material strip 34 is pushed forward in the tool component's illustrated initial position in FIG. 1 so far to the left that the length protruding over the cutting edge 28 is equal to twice the overall form length of a slot liner. If the moveable upper part 14 of the pillar guidance frame then advances its lower part 10, the lateral cutting plate 22 first cuts off double the overall form length of a slot liner from the insulation material strip on cutting edge 28. Almost simultaneously or immediately afterwards the form dies 20 begin to draw the insulation strip section into the form slots 26. It is possible to attach a non-illustrated support so that this does not slip through the tool components beforehand. Since the material of the slot liners to be formed is still initially connected in the middle, only strip material from the two outer sides is pulled into the form slots 26 when the form dies 20 first penetrate into the form slots 26. In the course of the forming process the central cutting plate 24 on cutting edge 30 meets the insulation material and separates it in the center between the two form slots 26. From this moment on the insulation material is pulled into each form slot 26 evenly on both sides. In order that in doing so the central cutting plate 24 does not hinder the drawing in of the insulation material into the right form slot 26, with reference to FIG. 1, slot 32 is designed wider than cutting plate 24 and equipped with a bevel as illustrated on the right edge. Otherwise the forming process, which takes place simultaneously and parallel in both for slots 26 in the invention, corresponds with the already known forming process using a single form slot and a single form die 20.

After forming of the slot liners the form dies 20 are pulled out of the form slots again and subsequently the insertion punches 40 are run axially through the form slots 26 and the slots 42 in form unit 44 with the free ends upwards, whereby the slot liners formed in the form slots 26 are pushed into the slots 46 of the stator lamination pack 48. The work cycle is completed in that the insertion punch 40 is drawn back again into the initial position shown in FIG. 2, the stator lamination pack 48 is turned further into such a position that two empty stator lamination pack slots 46 and slots 42 of the form unit are again flush and the insulation material strip 34 is also pushed forward again into the initial position as per FIG. 1.

Spacing, cross-section and relative arrangement of the form slots 26 and insertion punch 40 as well as thus also of the form die 20, cutting plate 24 and slots 42 in the form unit 44 are dependent in individual cases on the arrangement and cross-section of the two slots 46 to be lined in one work process of stator lamination pack 48. If the two stator slots to be lined lie directly next to one another then the form slots 26 and form dies 20 must also be arranged accordingly close to one another. Because practically no insulation material is located between form slots 26 in the initial situation as per FIG. 1 which might be pulled into the form slots 26 lying immediately next to each other during the forming process, practically the whole overall form length of the slot liners has to be pulled in accordingly each time from the outside into form slot 26 and the central cutting plate 24 may not cut through the insulation material on cutting edge 30 before completion of the feed movement of form die 20. If the two stator slots to be lined simultaneously lie apart by a multiple factor of the slot spacing, i.e. if other stator slots are located between the two stator slots to be lined simultaneously then a larger spacing results between the form slots 26 just as in the case of a large slot spacing. As in this case more insulation material has to be pulled in from the area between the two form slots 26, the leading edge of the central cutting plate 24 must also be pushed forward further relative to the free end of the form die 20 and become effective at an earlier stage at the cutting edge 30 during the forming process. In the illustrated simple version of the tool components of the forming tool, i.e. without additional brake shoes on the outside next to the form dies 20, the form slots 26 and form dies 20 can have a mean spacing of the size of the overall form length of a slot liner at the most. The insulation strip section must be separated before or immediately at the beginning of the forming process between the two form slots 26 so that the form dies 20 can pull in half the overall form length of the slot liner each time out of the area between the two form slots 26 and from the outside into form slot 26.

Favorable space conditions result for the tool components, if in the case of stator lamination packs with approximately 24 to 48 slots, two slots spaced with a three-fold circumferential slot division are to be lined simultaneously with slot liners whereby two further slots are thus located between each two slots to be lined, which are not to be lined in this work cycle. Using a number of identical stator slots divisable by the FIG. 2 for a three-fold circumferential spacing the slots to be lined in one working cycle can be indexed between work cycles with even rotational movements if each rotational movement complies with double the slot spacing.

The particularly simple construction of the forming tool in accordance with the invention depends on the form slots 26 and form dies 20 being set parallel and that the latter is moved in a straight line. A peculiarity is contained in this in that the slots 46 of stator 48 or also of a rotor are set radially. The drive for two radially moveable form dies relative to each other would be considerably more complicated than the parallel, straight movement of the two form dies 20 shown in the practical example. In the latter case the slot liners formed in the form slots 26 do indeed have to be relocated before being introduced into slots 46 of the stator lamination pack but this relocation does not provide any difficulties during the injection process, as it is sufficient for this purpose to locate the form unit 44 between matrix 18 and stator lamination pack 48 whose slots 42 run so obliquely that they form a transition between form slots 26 and slots 46 of stator lamination pack 48. Normally in fact one of the two flanks of each form slot 26 as well as the slot bed can be flush with the appropriate flank and the slot bed of stator slot 46 so that in each case only the side of the slot liner which does not lie on the flush slot flank has to be relocated by means of slot 42 in form unit 44 from its position assumed in form slot 26 into the position required for being pushed into stator slot 46. As derived from FIGS. 1 and 2, the insertion punches 40 also have a cross-section and arrangement such that they only lie against the flank of form slot 26 which is flush with the wall of stator slot 46 as well as against its slot bed, not however against the outer flanks of form slots 26. This reduced cross-section of the insertion punch 40 in comparison with the cross-section of form slots 26 allows these to also be pushed through the slots 42, bevelled on one side of the form unit, is on the other hand, however, also sufficient to push the slot liners reliably into the stator lamination pack.

The production time required until now for the insulation of slots is halved by the simultaneous production and introduction of two slot liners at a time into the stator lamination pack's slots. In order to achieve this result by the manner in accordance with the invention no additional guidance, drive nor control means are required but simply relatively slight changes in forming and cutting tools which are practically of no consequence in terms of cost. Apart from this devices with which only one slot could be lined until now during one work cycle can be re-equipped simply by replacing the special tool components described.

The identical stator slots are not always evenly distributed around the circumference of the stator drill-hole particularly not if a stator has several slots differing in cross-section. As in this case the spacing between slots of a certain size frequently changes, i.e. amount to varying multiples of the slot spacing, a time loss results for the known insulation machines of this type of model from the fact that the transmission indexes the stator lamination pack constantly step by step around the slot spacing and needs the time for one complete work cycle for this each time instead of executing a small and then a larger index step over several slot spacings in a certain sequence once or several times in rhythmical alternation. As this problem of varying angular spacings between the stator lamination pack's slots to be lined consecutively occurs more intensively if two slots are lined simultaneously, for then it may be necessary to jump over slots already lined in the direction of rotation when the stator lamination pack is being indexed step by step, a simple mechanical solution is also suggested for this problem with reference to FIG. 3 to 5.

During each work cycle the cam drum 16 carries out a complete turn and in doing so drives, as mentioned above, the moving tool components 20, 22 and 24 as well as insertion punch 40 via a lever transmission. The step by step rotational drive for the advance indexing of the stator lamination pack 48 after each insulation of two slots is also derived from cam drum 16. A Geneva cross transmission illustrated in FIGS. 3 and 4 serves this purpose in the known manner as is also already described in U.S. Pat. No. 2,340,291. In this case a Geneva cross 50 is connected torsionally stiffly to a Geneva cross shaft 52 next to cam drum 16 and mounted parallel to this. A driving roller 56 in off-center location is attached to the main shaft designated by 54 bearing the cam drum 16, which engages each time in one of several radial slots 58 in the Geneva cross 50 for each revolution of the main shaft 54 in the normal manner and turns this by a certain angular increment. The main shaft 54 locks the drive roller 56 against rotation by engaging in edge recesses 60 of the Geneva cross whilst the driving roller 56 is not located in engagement position with a radial slot 58. However, the main shaft 54, as shown in FIG. 4 is so cut out that it does not lock the Geneva cross 50 as long as it is driven positively by the driving roller 56. The step by step rotational movement of the Geneva cross shaft 52 is normally transferred as per FIG. 5 to the stator lamination pack 48 in accordance with the selected ratio of the gear wheels 62, 64 and 68, 72 via a single pair of change gears 62, 64, of which the latter is mounted on a swivelled change gear bracket 66 and is connected torsionally stiffly to a further gear wheel 68 which meshes with a gear wheel 72 connected torsionally stiffly with the work holder 70, supporting the stator lamination pack.

The peculiarity in accordance with the invention comprises the provision of additional mechanical, very simple, means which works absolutely reliably in order to change over the gear wheel ratio between the Geneva cross shaft 50 and the work holder 70 at a certain rhythm. For this purpose an additional cam 74 is attached to the cam drum 16 and the Geneva cross 52 is axially shiftable by a certain dimension, which suffices to disengage the two change gears 62, 64.and instead to engage two other change gears 76, 78 connected torsionally stiffly with the Geneva cross shaft 52 viz. gear wheel 68. For this purpose the Geneva cross shaft 52 is pushed downwards out of position as per FIG. 5 until the gear wheel 76 fixed to it assumes the shaded location.

As the Geneva cross 50 may not be shifted together with the axial shifting of the Geneva cross shaft 52 a program drum 80 is seated on the underside of the Geneva cross shaft 52, connected to it firmly but replaceable, which is mounted on a shaft 82 axially fixed by an inner central drill-hole., which carries the Geneva cross 50 and is mounted on its side by means of a bearing 84 on the housing designated by 86. The mounting of the program drum 80 on the axially fixed shaft 82 allows its limited axial shift capability just as the upper bearing designated by 88 of the Geneva cross 52 in FIG. 5. The torsionally stiff but axially elastic coupling between the Geneva cross 50 and the Geneva cross shaft 52 takes place via a driving ring 90 connected with the program drum 80, which carries two driving bolts 92 in the example which engage in the Geneva cross 50 in appropriate off-center drill-holes.

In order to be able to secure the Geneva cross shaft 52 in each of its two predetermined axial positions long enough to switch over, the axially fixed shaft 82 is fitted with two ring grooves of which only the lower one is shown and designated by 94 in FIG. 3. The space between the two ring grooves is in accordance with the dimension of the axial shift adjustment of the Geneva cross shaft 52. A non-illustrated ball is mounted inside the program drum 80 or onto the driving ring 90 firmly connected to it, which is pressed against the fixed shaft 82 by means of a spring and which engages each time in one of the ring grooves 94 in the axial end positions of the Geneva cross shaft 52.

In accordance with FIGS. 3 and 4 the program drum 80 is fitted with two groups of radial threaded drill-holes 96 distributed evenly over the circumference, arranged with axial spacing, into which bearing bolts upon which driving rollers 98 are mounted, can be screwed optionally. The number of drill-holes 96 in each ring-shaped row is in accordance with the the change positions of the Geneva cross 50 and the arrangement has in fact been so selected that in each case at each dwell point of the Geneva cross 50 a drill-hole 96 of each row as per FIG. 4 lies on the connecting level between the central axes of the Geneva cross and the main shaft 54 so that a cam roller 98 fixed to the drill-hole 96 points to the cam drum 16 and can be taken up by the change cam 74. Of the two drill-holes 96, which are set simultaneously to cam drum 16, one at the most, sometimes none, carry a cam roller 98.

The change cam 74 is so designed that it can be brought up to the program drum 80 in all rotational angular positions of the cam drum near enough to be able to reach a cam roller at the circumference inserted in the upper or lower row of drill-holes. The particular circumference range of the change cam 74 which moves past the program drum 80 during the change movement of the Geneva cross 50 is so narrow, i.e. has such a low height that it does not touch one of the cam rollers 98 either in the one or other axial end position of the Geneva cross shaft 52 and the program drum 80, independent whether it is located in the upper or lower row. Not before the Geneva cross 50 has adopted one of its dwell points again following a rotational change movement whilst the cam drum 16 continues to turn does a symmetrical thickening of the change cam 74 upwards and downwards, illustrated in FIG. 3 at 100, arrive in the immediate vicinity of the program drum 80. If a cam roller 98 is now inserted in the upper or lower rows of drill-holes just at this point, pointing towards the cam drum, then this will be taken up by the thickening 100 and thus the program drum 80 and Geneva cross shaft 52 pushed up viz. down until the arresting ball mentioned re-engages in the ring groove 94. This change process for switching the transmission connection from the change gear wheels 62, 64 to the change gear wheels 76, 78 or vice versa must be completed before the Geneva cross 50 is indexed further when the cam drum 16 is rotated again so that the axial and rotational movements of the Geneva cross shaft 52 take place simultaneously.

As can be seen from FIG. 4 the cam rollers 98 do not have to point towards the cam drum 16 in all change positions of the Geneva cross 50, but only in those change positions in which a change over between the change gear wheels should take place between two rotational switch movements of the stator lamination pack 48, whose gearing ratio determines by which angular increment the stator lamination pack 48 will be indexed for the next rotational change movement.

Preferably a non-illustrated electrical switch is actuated by the axial switch movement of the Geneva cross shaft 52 which in its lower axial position, at which the change gear wheels 76 and 78 are engaged, which have the effect that the stator lamination pack 48 executes a large rotational change increment, switches the drive motor of the main shaft 54 over to a reduced speed for the duration of the rotational change movement, since the rotational change movements of the stator lamination pack are normally very fast and it is therefore recommended maintaining the acceleration forces within limits for large change increments.

It is evident that the Geneva cross shaft 52 could be switched axially based on an electronic control signal by means of a servo-switch controlled by this or by another means, e.g. by means of switchable couplings, which change the gear wheel ratio between the Geneva cross shaft and the work holder 70. The switch-over described above, using an additional change cam 74 on cam drum 16 with positive engagement on the cam rollers 98 of the program drum 80 connected to the Geneva cross 52, has the advantage that faulty control which might destroy the machine is avoided with certainty with this device where movements of the workpiece and tool components essential to the functioning are carried out in a certain sequence consecutively and may not take place simultaneously under any circumstances.

I claim:

1. An apparatus for lining the slots of stator or rotor lamination packs for dynamoelectric machines with slot liners, said apparatus operating on a cycle to cut, form, and insert said liners, said apparatus including a rotatable work holder means for supporting a stator or rotor lamination pack, a forming tool comprising a matrix having at least one slot therein, a die plate including a forming die, an insertion punch means laterally moveable with respect to said forming die for pushing a slot liner out of the matrix and for inserting the slot liner into a slot of a stator or rotor lamination pack, and a change speed mechanism driven by a Geneva cross drive, said Geneva cross drive including a driven shaft, a cam drum means for executing one revolution for each cutting, forming, and inserting cycle, and a switch cam means having two axially opposed guidance surfaces located on said cam drum means, said switch cam means actuating said change speed mechanism for establishing two distinct different rotational speed ratios between said cam drum means and said work holder means.

2. The apparatus according to claim 1, wherein the change speed mechanism includes gear wheels for effecting the establishment of the different speed ratios, said wheels being seated on an axially slideable component of the driven shaft of said Geneva cross drive, said axially slideable component being fixed torsionally to the driven shaft of said Geneva cross drive said axially slideable component including a plurality of driving tongues which are distributed over the periphery of said axially slideable component, said tongues extending radially outwardly and interacting alternately with said switch cam means, each tongue being fixable in one of two different axial positions and contacting one of the two axially opposed guidance surfaces of said switch cam means.

* * * * *